United States Patent
Dong

(10) Patent No.: US 12,028,905 B2
(45) Date of Patent: Jul. 2, 2024

(54) METHOD AND DEVICE FOR DETERMINING RANDOM ACCESS CHANNEL OCCASION (RO)

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 17/621,165

(22) PCT Filed: Jun. 20, 2019

(86) PCT No.: PCT/CN2019/092095
§ 371 (c)(1),
(2) Date: Dec. 20, 2021

(87) PCT Pub. No.: WO2020/252744
PCT Pub. Date: Dec. 24, 2020

(65) Prior Publication Data
US 2022/0361246 A1 Nov. 10, 2022

(51) Int. Cl.
*H04W 74/0833* (2024.01)
*H04W 72/1268* (2023.01)
*H04W 72/52* (2023.01)

(52) U.S. Cl.
CPC ... *H04W 74/0833* (2013.01); *H04W 72/1268* (2013.01); *H04W 72/52* (2023.01)

(58) Field of Classification Search
None
See application file for complete search history.

(56) References Cited

U.S. PATENT DOCUMENTS

| | | | |
|---|---|---|---|
| 2020/0288506 A1* | 9/2020 | Lei | H04W 74/0833 |
| 2021/0084687 A1* | 3/2021 | Liu | H04W 74/0833 |
| 2021/0195631 A1* | 6/2021 | Christoffersson | H04W 74/0833 |
| 2021/0250991 A1* | 8/2021 | Liu | H04W 72/046 |
| 2021/0352733 A1* | 11/2021 | Ma | H04W 74/0833 |
| 2021/0352734 A1* | 11/2021 | Svedman | H04W 72/1263 |
| 2022/0053576 A1* | 2/2022 | Lu | H04W 74/0866 |
| 2022/0061101 A1* | 2/2022 | Wu | H04W 72/23 |
| 2022/0124818 A1* | 4/2022 | Lee | H04W 74/0833 |
| 2022/0217781 A1* | 7/2022 | Decarreau | G06N 3/08 |

(Continued)

FOREIGN PATENT DOCUMENTS

CN 102083138 A 6/2011

OTHER PUBLICATIONS

International Search Report of PCT Application No. PCT/CN2019/092095 dated Mar. 25, 2020 with English translation, (4p).

(Continued)

*Primary Examiner* — Anh Vu H Ly
(74) *Attorney, Agent, or Firm* — Arch & Lake LLP

(57) ABSTRACT

A method and a device for determining a random access channel occasion (RO) are provided. The method includes that: a terminal receives a load value, broadcasted by a base station, of a physical uplink shared channel (PUSCH) that has accessed the base station; and the terminal determines, according to the load value, a RO of the terminal accessing a network side.

17 Claims, 11 Drawing Sheets

(56) References Cited

U.S. PATENT DOCUMENTS

2022/0248469 A1* 8/2022 Cao .................. H04W 74/0833
2022/0368468 A1* 11/2022 Xiong ................. H04L 1/1854

OTHER PUBLICATIONS

Huawei, et al., "Considerations for simultaneous RACH operation", 3GPp TSG RAN WG1 Meeting #97 R1-1907540, May 3, 2019, (3p).
Oppo, "Criteria on RACH type selection", 3GPP TSG-RAN2 Meeting #106 R2-1905753, May 3, 2019, (2p).
Catt, "2-step RACH procedure", 3GPP TSG-RAN2 Meeting #106 R2-1905753, May 3, 2019, (4p).
Panasonic, "Discussion on 2-step RACH procedure", 3GPP TSG RAN WG1 #96bis R1-1904358, Apr. 12, 2019 (6p).

* cited by examiner

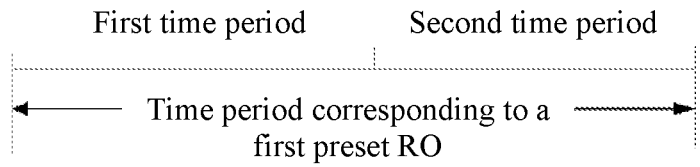

FIG. 2A

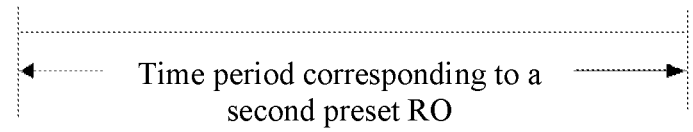

FIG. 2B

```
┌─────────────────────────────────────────────────┐
│ Receive a load value, broadcasted by a base     │
│ station, of a PUSCH that has accessed the base  │── 101
│ station                                         │
└─────────────────────────────────────────────────┘
                        │
                        ▼
┌─────────────────────────────────────────────────┐
│ Determine, according to the load value, a RO    │── 102
│ of the terminal accesses a network side         │
└─────────────────────────────────────────────────┘
```

FIG. 3

```
┌─────────────────────────────────────────────────┐
│ Receive a load value, broadcasted by a base     │
│ station, of a PUSCH that has accessed the base  │── 101
│ station                                         │
└─────────────────────────────────────────────────┘
                        │
                        ▼
┌─────────────────────────────────────────────────┐
│ Determine, according to the load value, a RO of │── 102
│ the terminal accesses a network side            │
└─────────────────────────────────────────────────┘
                        │
                        ▼
┌─────────────────────────────────────────────────┐
│ Determine a current state of the terminal       │── 103
└─────────────────────────────────────────────────┘
                        │
                        ▼
┌─────────────────────────────────────────────────┐
│ Determine, according to the load value and the  │
│ current state of the terminal, the RO of the    │── 104
│ terminal accesses the network side              │
└─────────────────────────────────────────────────┘
```

FIG. 4

METHOD AND DEVICE FOR DETERMINING RANDOM ACCESS CHANNEL OCCASION (RO)

CROSS-REFERENCE TO RELATED APPLICATION

The present application is a U.S. National Phase of International Patent Application Serial No. PCT/CN2019/092095 filed on Jun. 20, 2019. The entire contents of the above-cited application are hereby incorporated by reference in their entireties for all purposes.

BACKGROUND

In a NR (New Radio) system, a terminal can access a gNB (base station) by using a four-step random access mode or a two-step random access mode.

Although the terminal can access the gNB by using the four-step random access mode or the two-step random access mode, how the terminal selects a sending RO (Random Access Channel Occasion) has not yet been implemented.

SUMMARY

The present disclosure relates to the field of communications, in particular to a method and apparatus for determining a random access channel occasion (RO).

According to a first aspect of the present disclosure, a method for determining a RO is provided. The method is performed by a terminal and includes that: the terminal receives a load value broadcasted by a base station, of a physical uplink shared channel (PUSCH) that has accessed the base station; and the terminal determines, a RO of the terminal accessing a network side according to the load value.

According to a second aspect of the present disclosure, a method for determining a RO is provided. The method is performed by a base station and includes that the base station determines a load value of a PUSCH that has accessed the base station and broadcasts the load value to a terminal, so that the terminal determines, according to the load value, a RO of the terminal accessing a network side.

According to a third aspect of the present disclosure, a computer-readable storage medium is provided, the storage medium stores a computer program, and the computer program is used to execute the method for determining a RO according to the first aspect.

According to a fourth aspect of the present disclosure, a computer-readable storage medium is provided, the storage medium stores a computer program, and the computer program is used to execute the method for determining a RO according to the second aspect.

According to a fifth aspect of the present disclosure, a device for determining a RO is provided. The device includes a processor and a memory configured to store executable instructions of the processor.

Further, the processor is configured to: receive, a load value broadcasted by a base station, of a PUSCH that has accessed the base station; and determine, a RO of the terminal accessing a network side according to the load value.

According to a sixth aspect of the examples of the present disclosure, a device for determining a RO is provided. The device includes a processor and a memory configured to store executable instructions of the processor.

Further, the processor is configured to: determine a load value of a PUSCH that has accessed the base station; and broadcast the load value to a terminal, so that the terminal determines, according to the load value, a RO of the terminal accessing a network side.

It should be understood that the above general description and the following detailed description are only and explanatory, and cannot limit the present disclosure.

BRIEF DESCRIPTION OF DRAWINGS

The accompanying drawings herein are incorporated into the specification and constitute a part of the specification, show examples consistent with the present invention, and are used to explain the principle of the present invention together with the specification.

FIG. 2A is a schematic diagram illustrating a scenario of RO according to one or more examples;

FIG. 2B is a schematic diagram illustrating a scenario of RO according to one or more examples;

FIG. 3 is a schematic flowchart of a method for determining a RO according to an example;

FIG. 4 is a schematic flowchart of another method for determining a RO according to an example;

DETAILED DESCRIPTION OF THE EMBODIMENTS

Examples will be described in detail here, and examples thereof are shown in the accompanying drawings. When the following descriptions refer to the drawings, the same numbers in different drawings indicate the same or similar elements, unless otherwise indicated. The implementation manners described in the following examples do not represent all implementation manners consistent with the present invention. Instead, they are merely examples of apparatuses and methods consistent with some aspects of the present invention as detailed in the appended claims.

The terms used in the present disclosure are only for the purpose of describing specific examples, and are not intended to limit the present disclosure. The singular forms of "a", "the" and "this" used in the present disclosure and the appended claims are also intended to include plural forms, unless the context clearly expresses other meanings. It should also be understood that the term "and/or" used herein refers to and includes any or all possible combinations of one or more associated listed items.

It should be understood that the terms first, second, third, etc. may be used in the present disclosure to describe a variety of information, but the information should not be limited to these terms. These terms are only used to distinguish the same type of information from each other. For example, without departing from the scope of the present disclosure, the first information may also be referred to as second information, and similarly, the second information may also be referred to as first information. Depending on the context, the term "if" used herein may be interpreted as "when" or "while" or "in response to determining".

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In a NR (New Radio) system, a terminal can access a gNB (base station) by using a four-step random access mode or a two-step random access mode.

Figure 1A:
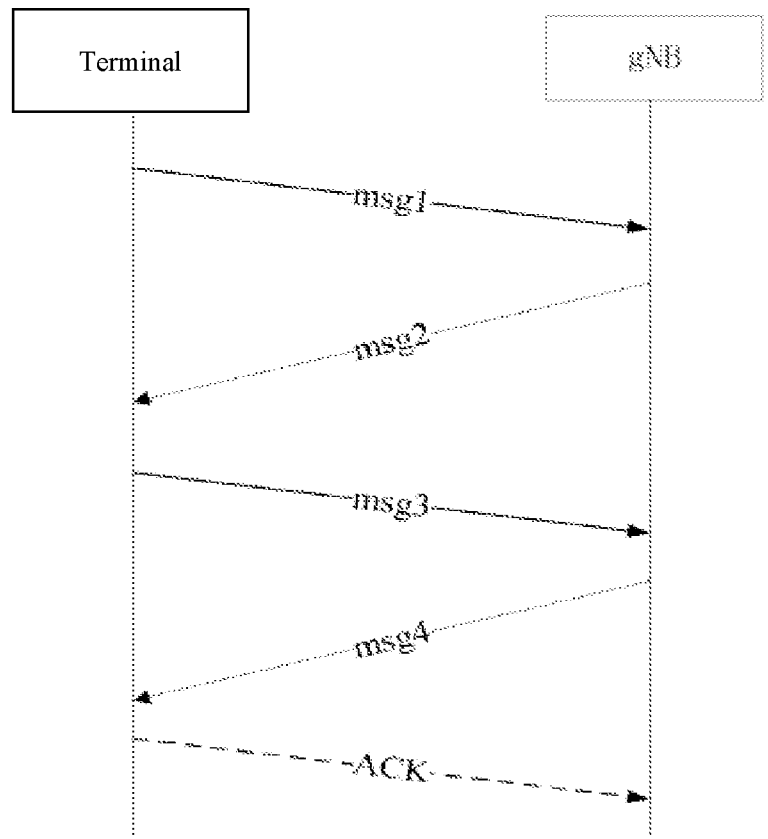
FIG. 1A is a schematic diagram illustrating a random access mode in related technologies.

The four-step random access mode is shown in FIG. 1A. The terminal sends msg1 to the gNB, the msg1 including a random access preamble. Msg2 replied by the gNB carries time domain resource and frequency domain resource parameters of msg3, and a TC-RNTI (Temporary Cell Radio Network Temporary Identity) is allocated to the terminal to realize uplink synchronization between the terminal and the gNB. In order to resolve conflicts, the terminal scrambles msg3 with TC-RNTI and sends msg3 to the gNB, the gNB replies msg4 to obtain the C-RNTI, and the terminal replaces the TC-RNTI with the C-RNTI after receiving the C-RNTI.

Figure 1B:
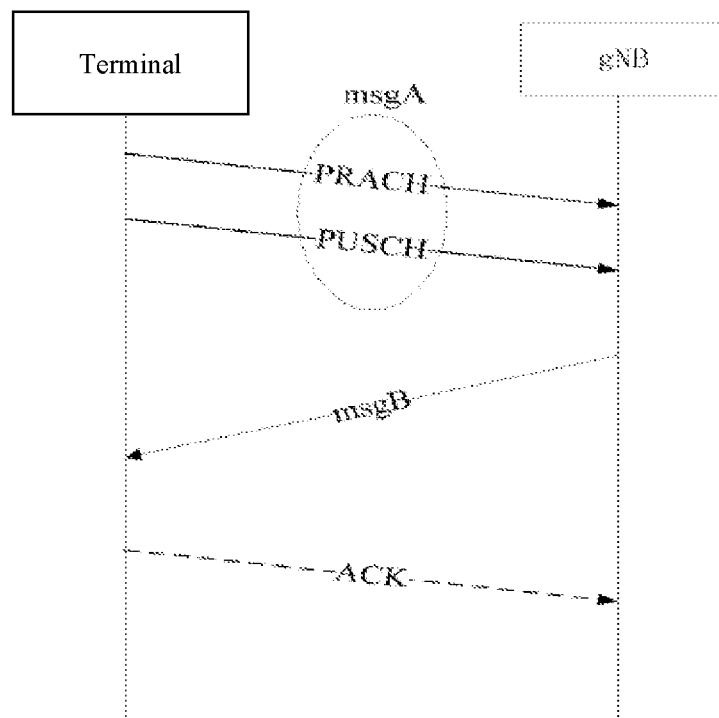
FIG. 1B is a schematic diagram illustrating a random access mode in related technologies.

The two-step random access mode is proposed in R16 (Release16), as shown in FIG. 1B, for example. The msg1 and msg3 are merged into msgA, and the msg2 and msg4 are merged into msgB. The msgA includes the random access preamble and payload.

Although the terminal can access the gNB by using the four-step random access mode or the two-step random access mode, how the terminal selects a sending RO (Random Access Channel Occasion) has not yet been implemented.

In the RAN1 (Radio Access Network 1) conference, ROs corresponding to two-step random access and four-step random access modes are proposed:

In a first mode (first preset RO), the ROs for two-step random access and four-step random access are independent.

That is, the time period corresponding to the RO is divided into a first time period and a second time period arranged sequentially, only the terminal using the two-step random access mode is allowed to send a random access preamble within the first time period, and only the terminal using the four-step random access mode is allowed to send a random access preamble within the second time period. Or vice versa, only the terminal using the four-step random access mode is allowed to send a random access preamble within the first time period, and only the terminal using the two-step random access mode is allowed to send a random access preamble within the second time period, as shown in FIG. 2A.

In a second mode (second preset RO), the ROs for two-step random access and four-step random access are shared.

That is, within the time period corresponding to the RO, the terminal using the two-step random access mode is allowed to send a random access preamble, and the terminal using the four-step random access mode is also allowed to send a random access preamble, for example, as shown in FIG. 2B.

In the example of the present disclosure, the RO in the first mode described above is taken as a first preset RO, and the RO in the second mode described above is taken as a second preset RO. However, the terminal cannot select which mode to use to send a random access preamble.

In order to solve the above problem, an example of the present disclosure provides a method for determining a random access channel occasion (RO). The method may be used in a terminal. Referring to FIG. 3, which is a flowchart of a method for determining a RO, the method may include the following steps:

in step 101, a load value, broadcasted by a base station, of a physical uplink shared channel (PUSCH) that has accessed the base station is received.

In this step, the base station is capable of counting the load value of the PUSCH (Physical Uplink Shared Channel) that has accessed the base station, and broadcast the load value to the terminal through a PBCH (Physical Broadcast Channel), and the terminal is capable of determining the load value after receiving.

In step 102, a RO of the terminal accesses a network side is determined according to the load value.

In this step, the terminal is capable of determining the RO according to the load value of the PUSCH that has accessed the base station. In some examples, if the load value is high, the terminal is capable of using the aforementioned first preset RO as its own RO, and if the load value is low, the terminal is capable of using the aforementioned second preset RO as its own RO.

In the above example, the terminal is capable of determining, according to a load value, broadcasted by a base station, of a PUSCH that has accessed the base station, a RO of the terminal accesses a network side, which achieves, on the terminal side, the purpose of determining the RO when accessing the network side.

In an example, the terminal can consider that the load value is high when the load value is greater than or equal to a preset threshold, and then the terminal can use the aforementioned first preset RO as its own RO.

For example, only the terminal using the two-step random access mode is allowed to send a random access preamble within the first time period corresponding to the first preset RO, and only the terminal using the four-step random access mode is allowed to send a random access preamble within the second time period. If the terminal currently uses the four-step random access mode, the terminal needs to send the random access preamble to the base station within the second time period.

In addition, the terminal can consider that the load value is low when the load value is less than the preset threshold, and then the terminal can use the aforementioned first preset RO as its own RO.

For example, regardless of whether the terminal currently uses the two-step random access mode or the four-step random access mode, it can send the random access preamble to the base station during the entire time period corresponding to the second preset RO.

In the above example, if the load value is greater than or equal to the preset threshold, the terminal may determine that the RO on the access network side is the first preset RO, otherwise, determine that the RO on the access network side is the second preset RO. The implementation is simple and the availability is high.

In an example, referring to FIG. 4, which is a flowchart of another method for determining a RO according to the example shown in FIG. 3, the method further includes:

In step 103, a current state of the terminal is determined.

In some examples, the current state of the terminal may be a target state, that is, the terminal is in a connected state, including an uplink out-of-synchronization state in which the terminal and the network side are, a state that uplink and downlink synchronization requires the network side to release SR (scheduling request) resources, and a handover state. Or the current state of the terminal may be an initial Access state.

In step 104, the RO when the terminal accesses the network side is determined according to the load value and the current state of the terminal.

In this step, the terminal can determine that the RO when the terminal accesses the network side is the first preset RO when the load value is high, that is, the load value is greater than or equal to the preset threshold, and the terminal is in the target state. The terminal can determine that the RO when the terminal accesses the network side is the second preset RO when the load value is low, that is, the load value is less than the preset threshold, and the terminal is not in the target state, for example, in the initial Access state.

If the terminal is in the target state, after the terminal sends a random access preamble, it needs to send a payload, and needs to scramble the existing C-RNTI by using a RA-RNTI (Random Access Radio Network Temporary Identifier). If the terminal is in the initial Access state, there is no C-RNTI.

In the above example, the terminal can further determine a current state, to determine, according to the load value and the current state, a RO of the terminal accesses a network side, which also achieves, on the terminal side, the purpose of determining the RO when accessing the network side.

Figure 5:
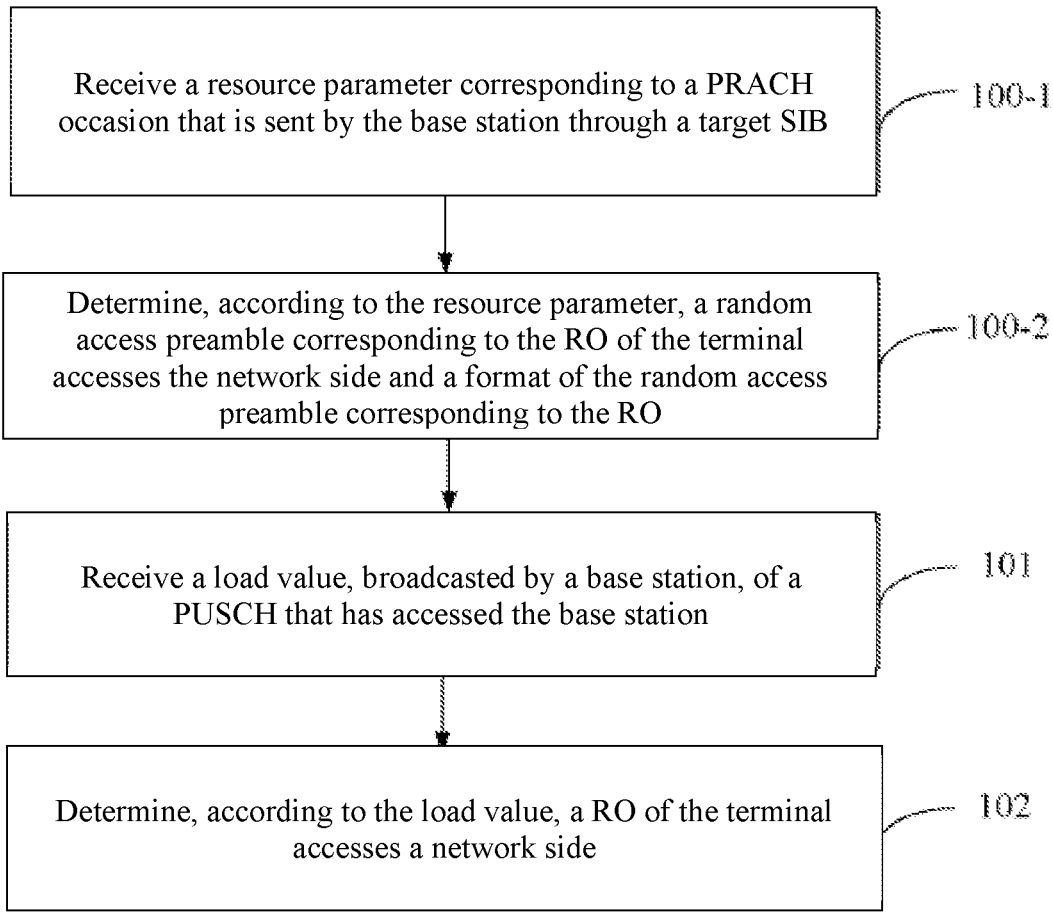
FIG. 5 is a schematic flowchart of another method for determining a RO according to an example.

In an example, referring to FIG. 5, which is a flowchart of another method for determining a RO according to the example shown in FIG. 3, before step 101 is performed, the method further includes:

In step 100-1, a resource parameter corresponding to a physical random access channel (PRACH) occasion that is sent by the base station through a target SIB is received.

In the example of the present disclosure, the target SIB (system info block) may be a SIB1 used to send the resource parameter in a related technology, or may also be other SIB specified in the NR standard.

The terminal can maintain downlink synchronization with the base station according to a SSB (Synchronization Signal Block) sent by the base station, and further, determine the resource parameter corresponding to the PRACH occasion according to the target SIB sent by the base station, that is, determine the resource parameter for the terminal sending RO according to the target SIB. In some examples, the resource parameter includes but is not limited to time domain resource parameters and frequency domain resource parameters.

In step 100-2, a random access preamble corresponding to the RO when the terminal accesses the network side and a format of the random access preamble corresponding to the RO are determined according to the resource parameter.

In this step, the terminal can determine, according to the resource parameter, the random access preamble according to the sending RO and the format of the random access preamble.

In the above example, the terminal can receive a resource parameter corresponding to a PRACH occasion that is sent by the base station through a target SIB, so as to determine, according to the resource parameter, a random access preamble corresponding to the RO when the terminal accesses the network side and a format of the random access preamble corresponding to the RO, which further achieves, on the terminal side, the purpose of determining the RO when accessing the network side.

Figure 6:
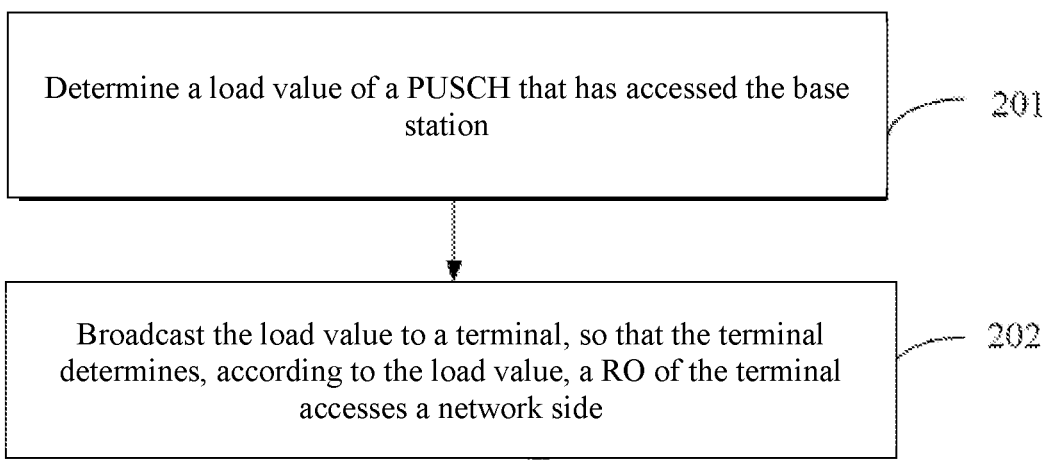
FIG. 6 is a schematic flowchart of another method for determining a RO according to an example.

An example of the present disclosure provides another method for determining a RO. The method may be used in a base station. Referring to FIG. 6, which is a flowchart of another method for determining a RO, the method may include the following steps:

In step 201, a load value of a PUSCH that has accessed the base station is determined.

In this step, the base station can automatically count the load value, sent by a terminal side, of the PUSCH that has accessed the base station within a preset time period.

In step 202, the load value is broadcasted to the terminal, so that the terminal determines, according to the load value, a RO of the terminal accesses a network side.

In this step, the base station can broadcast the load value to the terminal, and the terminal can determine, according to the load value, the RO when accessing the network side.

In the above example, the base station can determine a load value of a PUSCH that has accessed itself, and broadcast the load value to the terminal, so that the terminal determines, according to the load value, a RO of the terminal accesses a network side. The purpose of determining the RO by the terminal is achieved.

In an example, the base station may count a number of times that the base station has received random access preambles within a preset time period. The number of times that the base station has received random access preambles is used as the load value of the PUSCH.

Further, the base station may count a number of times that the base station has received the random access preambles within the preset time period and the base station has replied msgB but not received msgA payload. That is, the base station counts a number of times that the terminal using the two-step access mode has sent random preambles.

In addition, the base station may also count a number of times that the base station has received the random access preambles within the preset time period and the base station has replied msg2 but not received msg3. That is, the base station counts a number of times that the terminal using the four-step access mode has sent random preambles.

The base station uses the number of times that the terminal using the two-step access mode has sent random preambles, and/or the number of times that the terminal using the four-step access mode has sent random preambles, as the final load value of the PUSCH.

In the above example, the base station can automatically count the load value of the PUSCH that has accessed the base station, so the availability is high.

In an example, the base station may broadcast the load value to the terminal through a PB CH.

In the above example, the base station may broadcast the load value to the terminal through a PBCH. The terminal determines the RO according to the load value.

Figure 7:
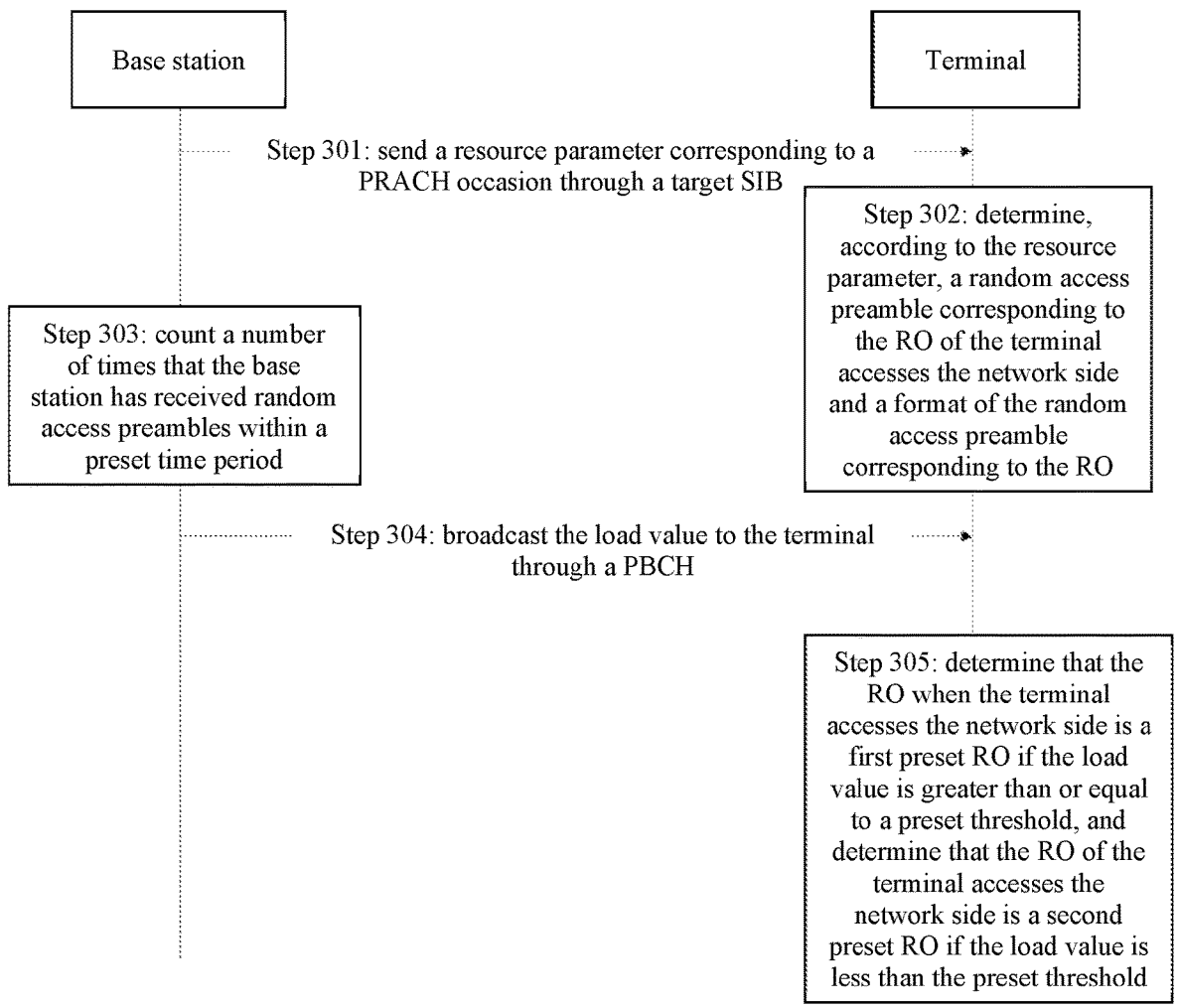
FIG. 7 is a schematic flowchart of another method for determining a RO according to an example.

In an example, referring to FIG. 7, which is a flowchart of another method for determining a RO according to an example, the method may include the following steps:

In step 301, a base station sends a resource parameter corresponding to a PRACH occasion through a target SIB.

In some examples, the target SIB may be a SIB1 used to send the resource parameter in a related technology, or may also be other SIB specified in the NR standard. The resource parameter includes but is not limited to time domain resource parameters and frequency domain resource parameters.

In step 302, a terminal determines, according to the resource parameter, a random access preamble corresponding to a RO of the terminal accesses a network side and a format of the random access preamble corresponding to the RO.

In step 303, the base station counts a number of times that the base station has received random access preambles within a preset time period.

In some examples, the base station counts a number of times that the base station has received the random access preambles within the preset time period and the base station has replied msgB but not received msgA payload, and/or counts a number of times that the base station has received the random access preambles within the preset time period and the base station has replied msg2 but not received msg3.

In step 304, the base station broadcasts a load value to the terminal through a PBCH.

In step 305, the terminal determines that the RO when the terminal accesses the network side is a first preset RO if the load value is greater than or equal to a preset threshold, and determines that the RO when the terminal accesses the network side is a second preset RO if the load value is less than the preset threshold.

The time period corresponding to the first preset RO is divided into a first time period and a second time period arranged sequentially, the first time period only allows to send a random access preamble corresponding to a first random access mode, and the second time period only allows to send a random access preamble corresponding to a second random access mode; a random access preamble corresponding to any random access mode is allowed to be sent within a time period corresponding to the second preset RO.

In the above example, the terminal is capable of determining, according to a load value, broadcasted by a base station, of a PUSCH that has accessed the base station, a RO of the terminal accesses a network side, which achieves, on the terminal side, the purpose of determining the RO when accessing the network side.

Figure 8:
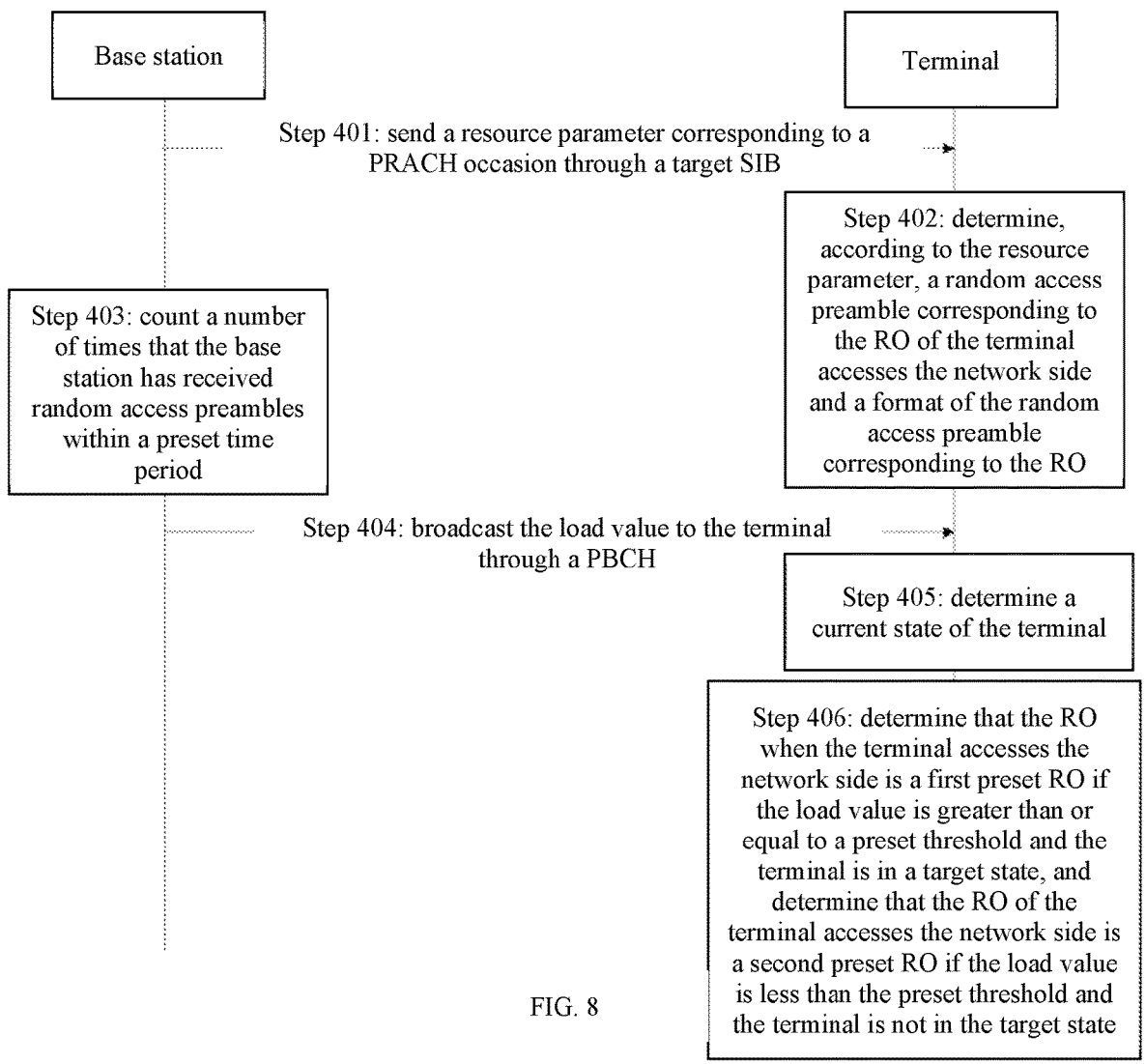
FIG. 8 is a schematic flowchart of another method for determining a RO according to an example.

In an example, referring to FIG. 8, which is a flowchart of another method for determining a RO according to an example, the method may include the following steps:

In step 401, a base station sends a resource parameter corresponding to a PRACH occasion through a target SIB.

In some examples, the target SIB may be a SIB1 used to send the resource parameter in a related technology, or may also be other SIB specified in the NR standard. The resource parameter includes but is not limited to time domain resource parameters and frequency domain resource parameters.

In step 402, a terminal determines, according to the resource parameter, a random access preamble corresponding to a RO of the terminal accesses a network side and a format of the random access preamble corresponding to the RO.

In step 403, the base station counts a number of times that the base station has received random access preambles within a preset time period.

In some examples, the base station counts a number of times that the base station has received the random access preambles within the preset time period and the base station has replied msgB but not received msgA payload, and/or counts a number of times that the base station has received the random access preambles within the preset time period and the base station has replied msg2 but not received msg3.

In step 404, the base station broadcasts a load value to the terminal through a PBCH.

In step 405, the terminal determines a current state of the terminal.

In step 406, the terminal determines that the RO when the terminal accesses the network side is a first preset RO if the load value is greater than or equal to a preset threshold and the terminal is in a target state, and determines that the RO when the terminal accesses the network side is a second preset RO if the load value is less than the preset threshold and the terminal is not in the target state.

The time period corresponding to the first preset RO is divided into a first time period and a second time period arranged sequentially, the first time period only allows to send a random access preamble corresponding to a first random access mode, and the second time period only allows to send a random access preamble corresponding to a second random access mode; a random access preamble corresponding to any random access mode is allowed to be sent within a time period corresponding to the second preset RO.

The target state is a connected state, including an uplink out-of-synchronization state in which the terminal and the network side are, a state that uplink and downlink synchronization requires the network side to release SR (scheduling request) resources, and a handover state. Or the current state of the terminal may be an initial Access state.

In the above example, the terminal can further determine a current state, to determine, according to the load value and the current state, a RO of the terminal accesses a network side, which also achieves, on the terminal side, the purpose of determining the RO when accessing the network side.

The technical solutions provided by the examples of the present disclosure can include the following beneficial effects:

in the examples of the present disclosure, the terminal is capable of determining, according to a load value, broadcasted by a base station, of a PUSCH that has accessed the base station, a RO when the terminal accesses the network side, which achieves, on the terminal side, the purpose of determining the RO when accessing the network side.

In the examples of the present disclosure, if the load value is greater than or equal to a preset threshold, the terminal is capable of determining that the RO when accessing the network side is a first preset RO, or else determining that the RO when accessing the network side is a second preset RO. The implementation is simple and the availability is high.

In the examples of the present disclosure, the terminal is capable of further determining a current state, to determine, according to the load value and the current state, a RO of the terminal accesses a network side, which also achieves, on the terminal side, the purpose of determining the RO when accessing the network side.

In the examples of the present disclosure, the terminal is capable of determining that the RO when the terminal accesses the network side is the first preset RO if the load value is greater than or equal to the preset threshold and the terminal is in a target state, and determining that the RO when the terminal accesses the network side is the second preset RO if the load value is less than the preset threshold and the terminal is not in the target state, so the availability is high.

In the examples of the present disclosure, the time period corresponding to the first preset RO is divided into a first time period and a second time period arranged sequentially, the first time period only allows to send a random access preamble corresponding to a first random access mode, the second time period only allows to send a random access preamble corresponding to a second random access mode, then the terminal is capable of sending a random access preamble within the time period corresponding to the random access mode adopted by itself, that is, within the first time period or the second time period, accessing the network side. A random access preamble corresponding to any random access mode is allowed to be sent within a time period corresponding to the second preset RO. Accordingly, the terminal is capable of sending a random access preamble within the time period corresponding to the second preset RO, accessing the network side. The purpose of determining the RO when accessing the network side is achieved on the terminal side.

In the examples of the present disclosure, the terminal is capable of receiving a resource parameter corresponding to a PRACH occasion that is sent by the base station through a target SIB, so as to determine, according to the resource parameter, a random access preamble corresponding to the RO when the terminal accesses the network side and a format of the random access preamble corresponding to the RO, which further achieves, on the terminal side, the purpose of determining the RO when accessing the network side.

In the examples of the present disclosure, the base station is capable of determining a load value of a PUSCH that has accessed itself, and broadcasting the load value to the terminal, so that the terminal determines, according to the load value, a RO of the terminal accesses a network side. The purpose of determining the RO by the terminal is achieved.

In the examples of the present disclosure, when determining the load value of the PUSCH, the base station is capable of counting a number of times that the base station has received random access preambles within a preset time period. In some examples, the base station is capable of counting a number of times that the base station has received the random access preambles within the preset time period and the base station has replied msgB but not received msgA payload, or counting a number of times that the base station has received the random access preambles within the preset time period and the base station has replied msg2 but not received msg3. In the above process, the base station is capable of automatically counting the load value of the PUSCH that has accessed the base station, so the availability is high.

In the examples of the present disclosure, the base station is capable of broadcasting the load value to the terminal through a PBCH. The terminal determines the RO according to the load value.

Corresponding to the foregoing application function implementation method examples, the present disclosure further provides examples of application function implementation apparatuses and corresponding terminals.

Figure 9:
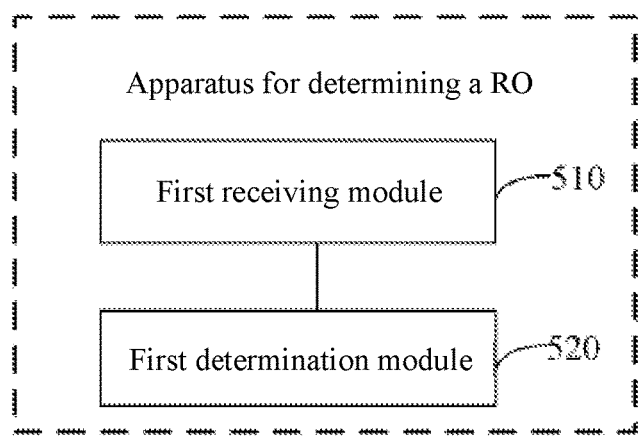
FIG. 9 is a block diagram of an apparatus for determining a RO according to an example.

Referring to FIG. 9, which is a block diagram of an apparatus for determining a RO according to an example, the apparatus is used in a terminal and includes:

a first receiving module 510, configured to receive a load value, broadcasted by a base station, of a PUSCH that has accessed the base station; and a first determination module 520, configured to determine, according to the load value, a RO of the terminal accesses a network side.

Figure 10:
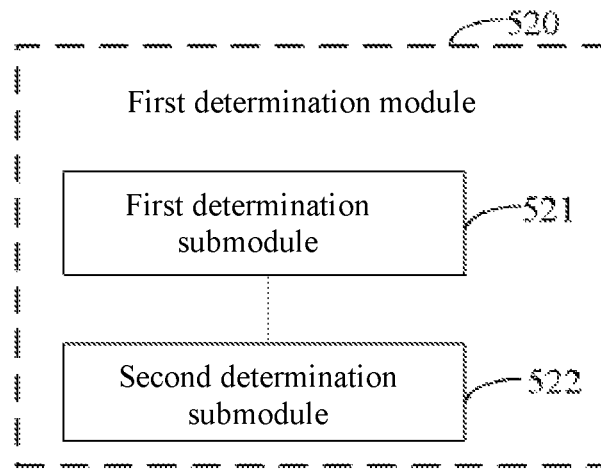
FIG. 10 is a block diagram of another apparatus for determining a RO according to an example.

Referring to FIG. 10, which is a block diagram of another apparatus for determining a RO based on the example shown in FIG. 9, the first determination module 520 includes:

a first determination submodule 521, configured to determine that the RO when the terminal accesses the network side is a first preset RO if the load value is greater than or equal to a preset threshold; and a second determination submodule 522, configured to determine that the RO when the terminal accesses the network side is a second preset RO if the load value is less than the preset threshold.

Figure 11:
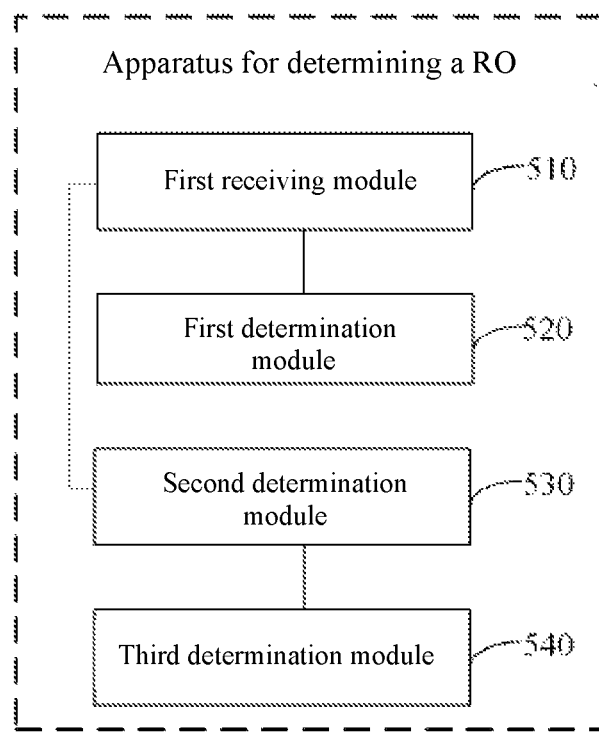
FIG. 11 is a block diagram of another apparatus for determining a RO according to an example.

Referring to FIG. 11, which is a block diagram of another apparatus for determining a RO based on the example shown in FIG. 9, the apparatus further includes:

a second determination module 530, configured to determine a current state of the terminal; and a third determination module 540, configured to determine, according to the load value and the current state of the terminal, the RO when the terminal accesses the network side.

Figure 12:
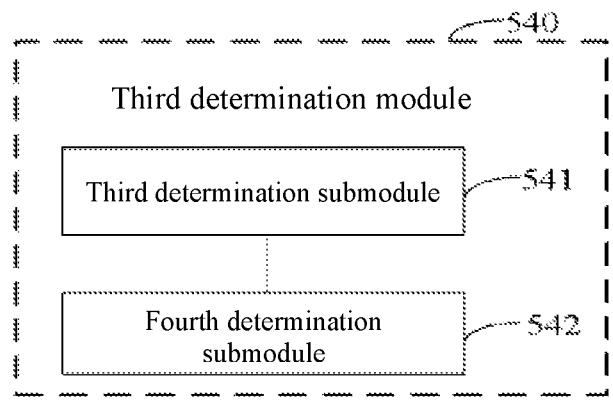
FIG. 12 is a block diagram of another apparatus for determining a RO according to an example.

Referring to FIG. 12, which is a block diagram of another apparatus for determining a RO based on the example shown in FIG. 11, the third determination module 540 includes:

a third determination submodule 541, configured to determine that the RO when the terminal accesses the network side is the first preset RO if the load value is greater than or equal to the preset threshold and the terminal is in a target state; and a fourth determination submodule 542, configured to determine that the RO when the terminal accesses the network side is the second preset RO if the load value is less than the preset threshold and the terminal is not in the target state.

In some examples, the time period corresponding to the first preset RO is divided into a first time period and a second time period arranged sequentially, the first time period only allows to send a random access preamble corresponding to a first random access mode, and the second time period only allows to send a random access preamble corresponding to a second random access mode;

a random access preamble corresponding to any random access mode is allowed to be sent within a time period corresponding to the second preset RO.

Figure 13:
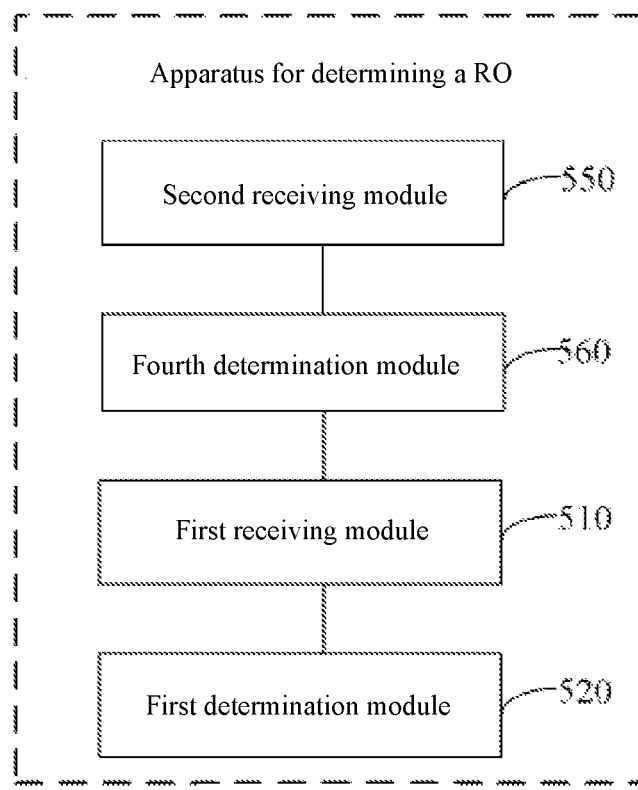
FIG. 13 is a block diagram of another apparatus for determining a RO according to an example.

Referring to FIG. 13, which is a block diagram of another apparatus for determining a RO based on the example shown in FIG. 9, the apparatus further includes:

a second receiving module 550, configured to receive a resource parameter corresponding to a PRACH occasion that is sent by the base station through a target SIB; and a fourth determination module 560, configured to determine, according to the resource parameter, a random access preamble corresponding to the RO when the terminal accesses the network side and a format of the random access preamble corresponding to the RO.

Figure 14:
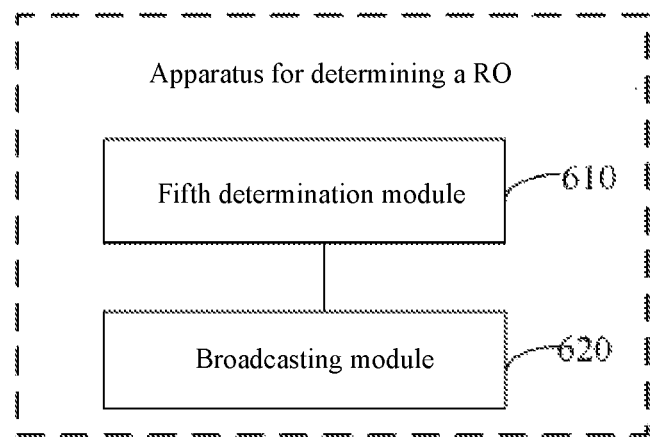
FIG. 14 is a block diagram of another apparatus for determining a RO according to an example.

Referring to FIG. 14, which is a block diagram of another apparatus for determining a RO according to an example, the apparatus is used in a base station and includes:

a fifth determination module 610, configured to determine a load value of a PUSCH that has accessed the base station; and a broadcasting module 620, configured to broadcast the load value to a terminal, so that the terminal determines, according to the load value, a RO of the terminal accesses a network side.

Figure 15:
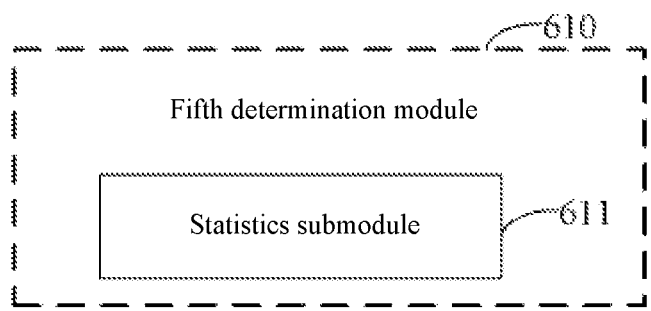
FIG. 15 is a block diagram of another apparatus for determining a RO according to an example.

Referring to FIG. 15, which is a block diagram of another apparatus for determining a RO based on the example shown in FIG. 14, the fifth determination module 610 includes:

a statistics submodule 611, configured to count a number of times that the base station has received random access preambles within a preset time period.

Figure 16:
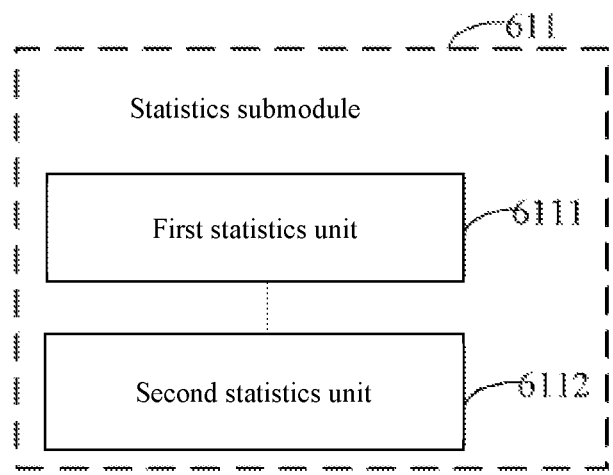
FIG. 16 is a block diagram of another apparatus for determining a RO according to an example.

Referring to FIG. 16, FIG. 16 is a block diagram of another apparatus for determining a RO based on the example shown in FIG. 15, the statistics submodule 611 includes:

a first statistics unit 6111, configured to count a number of times that the base station has received the random access preambles within the preset time period and the base station has replied msgB but not received msgA payload; and/or a second statistics unit 6112, configured to count a number of times that the base station has received the random access preambles within the preset time period and the base station has replied msg2 but not received msg3.

Figure 17:
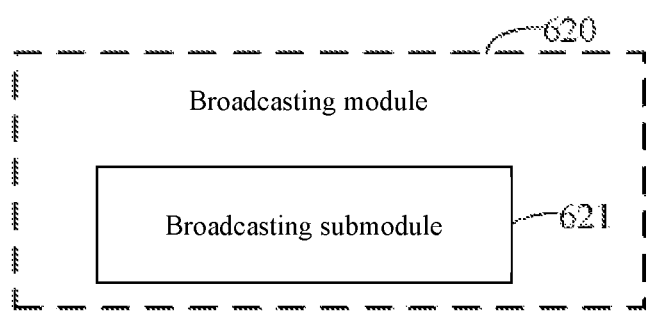
FIG. 17 is a block diagram of another apparatus for determining a RO according to an example.

Referring to FIG. 17, which is a block diagram of another apparatus for determining a RO based on the example shown in FIG. 16, the broadcasting module 620 includes:

a broadcasting submodule 621, configured to broadcast the load value to the terminal through a PB CH.

With regard to the apparatus examples, since they substantially correspond to the method examples, relevant parts may refer to the parts of the method examples. The apparatus examples described above are merely illustrative. The units described above as separate components may or may not be physically separated, and the components displayed as units may or may not be physical units, that is, they may be located in one place, or may be distributed to a plurality of network units. Some or all of the modules may be selected according to actual needs to achieve the objectives of the solutions of the present disclosure. Those of ordinary skill in the art can understand and implement without any creative effort.

Correspondingly, the present disclosure further provides a computer-readable storage medium, the storage medium stores a computer program, and the computer program is used to execute any of the aforementioned methods for determining a RO on a terminal side.

Correspondingly, the present disclosure further provides a computer-readable storage medium, the storage medium stores a computer program, and the computer program is used to execute any of the aforementioned methods for determining a RO on a base station side.

Correspondingly, the present disclosure further provides a device for determining a RO. The device is used in a terminal and includes:

a processor; and a memory configured to store executable instructions of the processor;

the processor is configured to:

receive a load value, broadcasted by a base station, of a PUSCH that has accessed the base station; and determine, according to the load value, a RO of the terminal accesses a network side.

Figure 18:
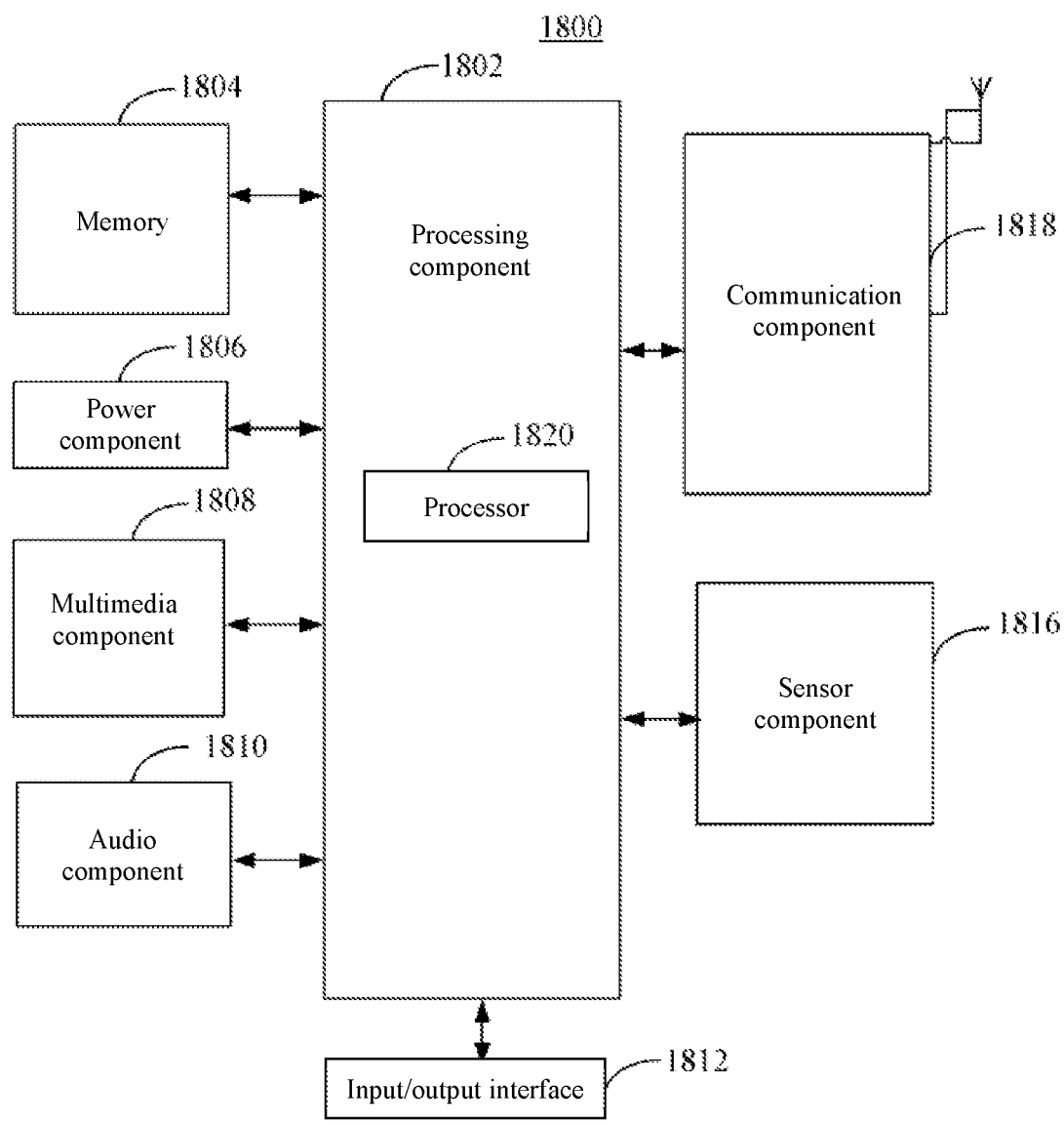
FIG. 18 is a schematic structural diagram of a device for determining a RO according to an example of the present disclosure.

FIG. 18 is a block diagram of an electronic device 1800 according to an example. For example, the electronic device 1800 may be a terminal such as a mobile phone, a tablet computer, an e-book reader, a multimedia playback device, a wearable device, or a vehicle-mounted terminal.

Referring to FIG. 18, the electronic device 1800 may include one or more of the following components: a processing component 1802, a memory 1804, a power component 1806, a multimedia component 1808, an audio component 1810, an input/output (I/O) interface 1812, a sensor component 1816, and a communication component 1818.

The processing component 1802 generally controls the overall operations of the electronic device 1800, such as operations associated with display, telephone calls, data communications, camera operations and recording operations. The processing component 1802 may include one or more processors 1820 to execute instructions to complete all of or part of the steps of the above method. Moreover, the processing component 1802 may include one or more modules to facilitate interaction between the processing component 802 and other components. For example, the processing component 1802 may include a multimedia module to facilitate interaction between the multimedia component 1808 and the processing component 1802. For another example, the processing component 802 may read executable instructions from the memory to implement the steps of the method for determining a RO provided by the foregoing examples.

The memory 1804 is configured to store various types of data to support operations in the electronic device 1800. Examples of these data include instructions for any application or method operated on the electronic device 1800, contact data, phone book data, messages, pictures, videos, etc. The memory 804 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 1806 provides power to various components of the electronic device 1800. The power component 806 may include a power management system, one or more power supplies, and other components associated with the generation, management, and distribution of power for the electronic device 800.

The multimedia component 1808 includes a display screen that provides an output interface between the electronic device 1800 and the user. In some examples, the multimedia component 1808 includes a front camera and/or a rear camera. When the electronic device 1800 is in an operation mode, such as a shooting mode or a video mode, the front camera and/or the rear camera may receive external multimedia data. Each front or rear camera may be a fixed optical lens system or have a focal length and optical zoom capability.

The audio component 1810 is configured to output and/or input audio signals. For example, the audio component 810 includes a microphone (MIC), which is configured to receive external audio signals when the electronic device 1800 is in an operation mode, such as a call mode, a recording mode and a voice recognition mode. The received audio signals may be further stored in the memory 1804 or sent by the communication component 1818. In some examples, the audio component 1810 further includes a speaker for outputting audio signals.

The I/O interface 1812 provides an interface between the processing component 1802 and a peripheral interface module. The peripheral interface module may be a keyboard, a click wheel, a button, etc. The button may include but is not limited to a home button, a volume button, a start button and a lock button.

The sensor component 1816 includes one or more sensors, which are used to provide the electronic device 1800 with various aspects of state evaluation. For example, the sensor component 1816 can detect the on/off state of the electronic device 1800 and the relative positions of the components. For example, the components are a display and a keypad of the electronic device 1800. The sensor component 1816 can also detect the position change of the electronic device 1800 or one component of the electronic device 1800, the presence or absence of contact between the user and the electronic device 1800, the orientation or acceleration/deceleration of the electronic device 1800, and the temperature change of the electronic device 1800. The sensor component 1816 may include a proximity sensor configured to detect the presence of nearby objects without any physical contact. The sensor component 1816 may also include an optical sensor, such as a CMOS or CCD image sensor, for use in imaging applications. In some examples, the sensor component 1816 may also include an acceleration sensor, a gyro sensor, a magnetic sensor, a pressure sensor, or a temperature sensor.

The communication component 1818 is configured to facilitate wired or wireless communication between the electronic device 1800 and other devices. The electronic device 1800 can access wireless networks based on communication standards, such as WiFi, 2G, 3G, 4G or 5G, or a combination thereof. In one example, the communication component 1818 receives broadcast signals or broadcast associated information from an external broadcast management system via a broadcast channel. In one example, the communication component 1818 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In an example, the electronic device 1800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In an example, a non-transitory machine-readable storage medium including instructions is further provided, such as a memory 1804 including instructions. The instructions can be executed by the processor 1820 of the electronic device 1800 to complete the above-mentioned method for determining a RO on a terminal side. For example, the non-transitory computer-readable storage medium may be an ROM, a random access memory (RAM), a CD-ROM, a magnetic tape, a floppy disk, an optical data storage device, etc.

Correspondingly, the present disclosure further provides a device for determining a RO. The device is used in a base station and includes:
 a processor; and
 a memory configured to store executable instructions of the processor;
 the processor is configured to:
 determine a load value of a PUSCH that has accessed the base station; and
 broadcast the load value to a terminal, so that the terminal determines, according to the load value, a RO of the terminal accesses a network side.

Figure 19:
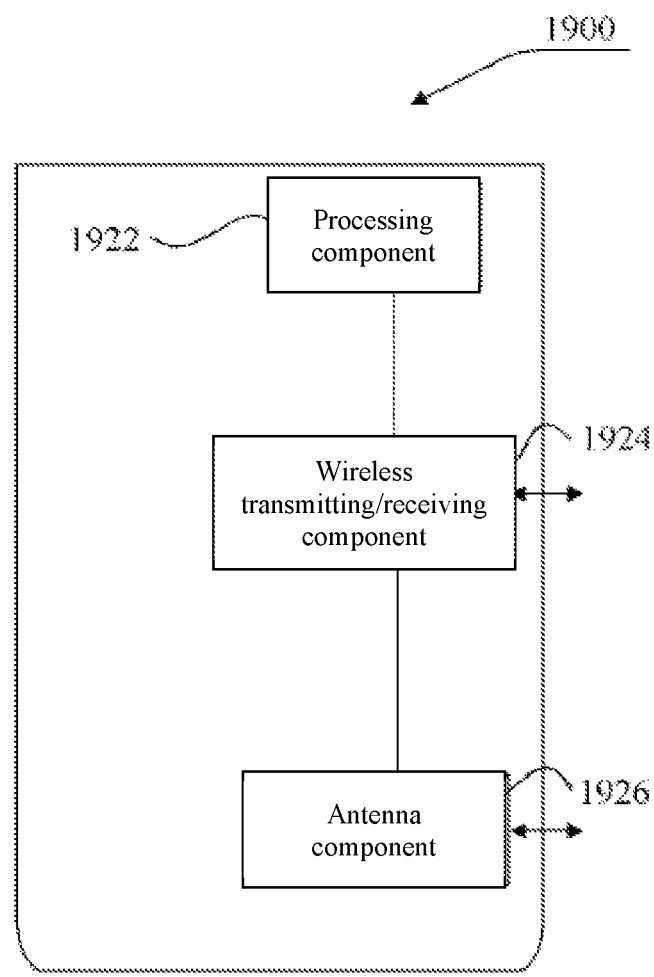
FIG. 19 is a schematic structural diagram of another device for determining a RO according to an example of the present disclosure.

As shown in FIG. 19, FIG. 19 is a schematic structural diagram of a device 1900 for determining a RO according to an example of the present disclosure. The device 1900 may be provided as a base station. Referring to FIG. 19, the device 1900 includes a processing component 1922, a wireless transmitting/receiving component 1924, an antenna component 1926, and a signal processing part specific to a wireless interface. The processing component 1922 may further include one or more processors.

One of the processors in the processing component 1922 may be configured to execute any one of the foregoing methods for determining a RO on a station side.

According to the present invention, the RO where the terminal accesses the network side can be determined according to the load value, broadcasted by the base station, of the PUSCH that has accessed the base station, and the purpose of determining the RO where the network side is accessed is achieved at a terminal side.

A person skilled in the art would readily conceive of other examples of the present disclosure after considering the specification and practicing the invention disclosed herein. The present disclosure is intended to cover any variations, uses or adaptive changes of the present disclosure. These variations, uses or adaptive changes follow the general principle of the present disclosure and include common general knowledge or conventional technical means in the technical field that are not disclosed in the present disclosure. The description and the examples are merely regarded as exemplary, and the real scope and spirit of the present disclosure are indicated by the following claims.

It should be understood that the present disclosure is not limited to the precise structure that has been described above and shown in the drawings, and various modifications and changes can be made without departing from its scope. The scope of the disclosure is only limited by the appended claims.

What is claimed is:

1. A method for determining a random access channel occasion (RO), comprising:

receiving, by a terminal, a load value broadcasted by a base station, of a physical uplink shared channel (PUSCH) that has accessed the base station; and determining, by the terminal, a RO of the terminal accessing a network side according to the load value;

the method further comprising:

determining a current state of the terminal; and determining, according to the load value and the current state of the terminal, the RO of the terminal accessing the network side.

2. The method according to claim 1, wherein determining the RO of the terminal accessing the network side according to the load value comprises:

in response to determining that the load value is greater than or equal to a preset threshold, determining that the RO of the terminal accessing the network side is a first preset RO; or in response to determining that the load value is less than the preset threshold, determining that the RO of the terminal accessing the network side is a second preset RO.

3. The method according to claim 1, wherein determining, according to the load value and the current state of the terminal, the RO of the terminal accessing the network side comprises:

in response to determining that the load value is greater than or equal to a preset threshold and the terminal is in a target state, determining that the RO of the terminal accessing the network side is a first preset RO; or in response to determining that the load value is less than the preset threshold and the terminal is not in the target state, determining that the RO of the terminal accessing the network side is a second preset RO.

4. The method according to claim 2, wherein a time period corresponding to the first preset RO is divided into a first time period and a second time period arranged sequentially, the first time period only allows to send a random access preamble corresponding to a first random access mode, and the second time period only allows to send a random access preamble corresponding to a second random access mode; and a random access preamble corresponding to any random access mode is allowed to be sent within a time period corresponding to the second preset RO.

5. The method according to claim 1, further comprising:

receiving a resource parameter corresponding to a physical random access channel (PRACH) occasion sent by the base station through a target system info block (SIB); and determining, according to the resource parameter, a random access preamble corresponding to the RO of the terminal accessing the network side and a format of the random access preamble corresponding to the RO.

6. A method for determining a random access channel occasion (RO), comprising:

determining, by a base station, a load value of a physical uplink shared channel (PUSCH) that has accessed the base station; and broadcasting, by the base station, the load value to a terminal, so that the terminal determines, according to the load value, a RO of the terminal accessing a network side;

wherein the RO of the terminal accessing the network side is determining according to the load value and a current state of the terminal.

7. The method according to claim 6, wherein determining the load value of the PUSCH that has accessed the base station comprises:

counting a number of times that the base station has received random access preambles within a preset time period.

8. The method according to claim 7, wherein counting the number of times that the base station has received the random access preambles within the preset time period comprises:

counting the number of times that the base station has received the random access preambles within the preset time period and the base station has replied msgB but not received msgA payload; or counting the number of times that the base station has received the random access preambles within the preset time period and the base station has replied msg2 but not received msg3.

9. The method according to claim 6, wherein broadcasting the load value to the terminal comprises:

broadcasting the load value to the terminal through a physical broadcast channel (PBCH).

10. A non-transitory computer-readable storage medium, wherein the storage medium stores a computer program, and the computer program is used to execute the method for determining a random access channel occasion (RO) according to claim 1.

11. A non-transitory computer-readable storage medium, wherein the storage medium stores a computer program, and the computer program is used to execute the method for determining a random access channel occasion (RO) according to claim 7.

12. A terminal for determining a random access channel occasion (RO), comprising:

a processor; and a memory for storing processor executable instructions;

wherein, the processor is configured to:

receive, a load value broadcasted by a base station, of a physical uplink shared channel (PUSCH) that has accessed the base station; and determine, a RO of the terminal accessing a network side according to the load value;

the processor is further configured to:

determine a current state of the terminal; and determine, according to the load value and the current state of the terminal, the RO of the terminal accessing the network side.

13. The terminal according to claim 12, wherein the processor is further configured to:

in response to determining that the load value is greater than or equal to a preset threshold, determine that the RO of the terminal accessing the network side is a first preset RO; or in response to determining that the load value is less than the preset threshold, determine that the RO of the terminal accessing the network side is a second preset RO.

14. The terminal according to claim 12, wherein the processor is further configured to:

in response to determining that the load value is greater than or equal to a preset threshold and the terminal is in a target state, determine that the RO of the terminal accessing the network side is a first preset RO; or in response to determining that the load value is less than the preset threshold and the terminal is not in the target state, determine that the RO of the terminal accessing the network side is a second preset RO.

15. The terminal according to claim 13, wherein a time period corresponding to the first preset RO is divided into a first time period and a second time period arranged sequentially, the first time period only allows to send a random access preamble corresponding to a first random access mode, and the second time period only allows to send a random access preamble corresponding to a second random access mode; and a random access preamble corresponding to any random access mode is allowed to be sent within a time period corresponding to the second preset RO.

16. The terminal according to claim 12, wherein the processor is further configured to:

receive a resource parameter corresponding to a physical random access channel (PRACH) occasion sent by the base station through a target system info block (SIB); and determine, according to the resource parameter, a random access preamble corresponding to the RO of the terminal accessing the network side and a format of the random access preamble corresponding to the RO.

17. A base station for determining a random access channel occasion (RO), comprising:

a processor; and a memory for storing processor executable instructions;

wherein, the processor is configured to execute the method for determining a RO according to claim 6.

* * * * *